Aug. 28, 1951     R. H. THORNER     2,565,579
AUTOMATICALLY RELEASING COUPLING
FOR THE TRANSMISSION OF TORQUE
Filed June 7, 1946                             2 Sheets-Sheet 1
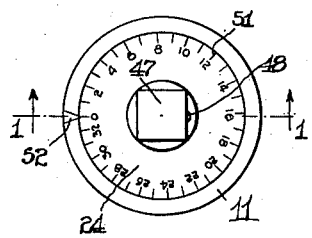
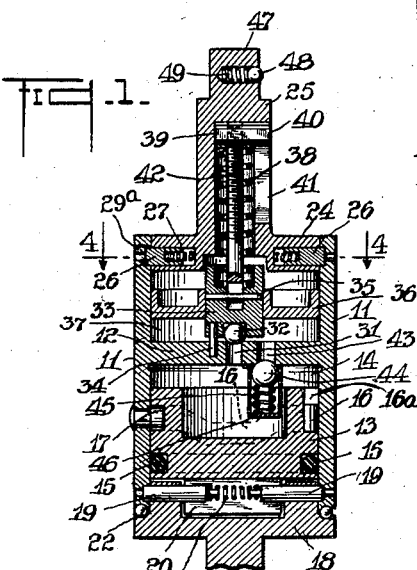
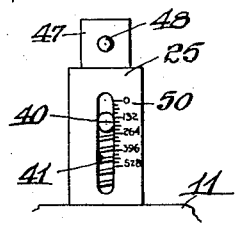
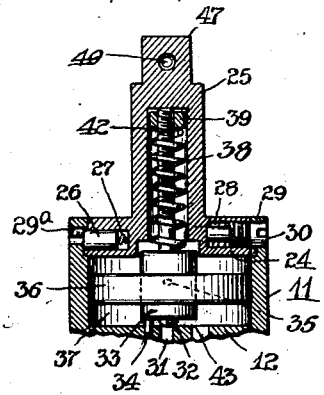
Robert H. Thorner
INVENTOR
BY
his ATTORNEY Aug. 28, 1951
R. H. THORNER
2,565,579
AUTOMATICALLY RELEASING COUPLING
FOR THE TRANSMISSION OF TORQUE
Filed June 7, 1946
2 Sheets-Sheet 2
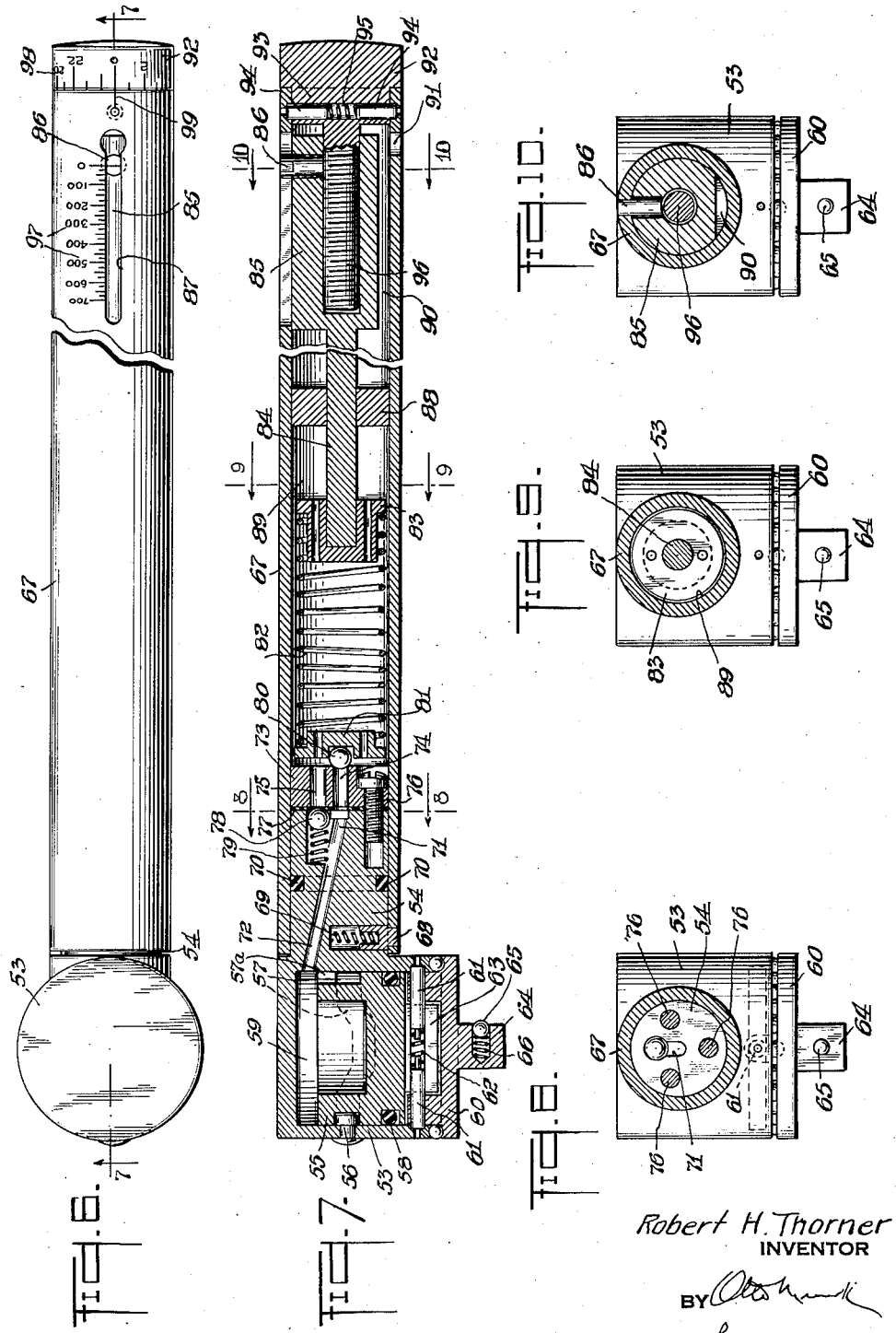
Robert H. Thorner
INVENTOR
BY
his ATTORNEY Patented Aug. 28, 1951

2,565,579

UNITED STATES PATENT OFFICE 2,565,579

AUTOMATICALLY RELEASING COUPLING FOR THE TRANSMISSION OF TORQUE

Robert H. Thorner, Detroit, Mich.

Application June 7, 1946, Serial No. 675,149

6 Claims. (Cl. 64—28)

The present invention relates to a hydraulic automatically releasing clutch or coupling for the transmission of torque up to a predetermined limit from a driving member, such as a driving shaft, to a driven member, such as a driven shaft. In one aspect thereof, the invention relates specifically to power or hand operated wrenches for driving nuts, screws or similar rotary objects, the wrench being automatically released when the torque exceeds a predetermined value.

One object of the invention is to provide a self-releasing clutch or coupling for the transmission of torque up to a predetermined value which is of simple and compact construction and reliable in operation.

Another object of the invention is to provide a coupling of this type in which hydraulic means controlled by resilient means of comparatively small dimensions serve to maintain the coupling parts locked together and unlocking is automatically effected when the fluid force produced by the torque reached a value which is many times greater than the force of said resilient means.

A further object of the invention is to render a torque coupling adjustable so that it will release at any selected torque value, and to provide simple, accurate and reliable means for effecting such adjustment.

Still another object of the invention is to provide an automatically releasing torque coupling which is adjustable to release at any selected torque value and in which indicator means show in each adjusted position exactly the torque value at which the coupling will release.

A still further object of the invention is to provide a torque coupling in which the coupling parts are locked together by means of a substantially incompressible pressure fluid trapped in a variable volume chamber, and discharged from said chamber into a reservoir when the predetermined torque limit is exceeded, said coupling including means for returning the pressure fluid from the reservoir to the variable volume chamber.

A special object of the invention is to provide a power or hand operated wrench for driving nuts, bolts or similar rotary objects in which the force applied to the driving part of the wrench is no longer transmitted to the driven part thereof when the torque applied to the object to be driven exceeds a predetermined limit which may be selected by the operator.

These and other objects which will appear more clearly as the specification proceeds, are accomplished, according to the present invention, by the arrangement and combination of elements set forth in the following detailed description, defined in the appended claims and illustratively exemplified in the accompanying drawings in which:

Fig. 1 is an axial section taken on line 1—1 of Fig. 2 through a torque coupling according to the invention, to be used for instance as a power operated wrench for driving nuts, Fig. 2 is a top elevation of the coupling shown in Fig. 1, Fig. 3 is an elevation of the upper part of the coupling shown in Fig. 1 seen from the right hand side in Fig. 1, the adjusted position of the elements differing somewhat from that shown in Fig. 1.

Fig. 4 is a cross-section taken on line 4—4 of Fig. 1,

Fig. 5 is a partial sectional view taken on line 5—5 of Fig. 4, a few parts being shown in elevation.

Fig. 6 is a top elevation of a hand operated wrench according to the invention,

Fig. 7 is a section taken on line 7—7 of Fig. 6 and

Figs. 8 to 10 are cross-sections taken on lines 8—8, 9—9 and 10—10 respectively, of Fig. 7.

Referring now to the figures, and first to Figs. 1 to 5, 11 denotes a cylindrical housing open at both ends and provided intermediate its ends with a fixed transverse wall 12 subdividing the housing 11 into an upper and a lower compartment. The housing 11 is provided in its inner wall near each end thereof with a peripheral groove. A piston 13 is slidable and rotatable in the lower compartment and defines between the piston head and the transverse wall 12 a variable volume chamber 14 adapted to receive a substantially incompressible pressure fluid, such as oil or the like. Near its lower end the piston 13 is formed with a peripheral groove in which a sealing gasket, such as a synthetic rubber ring 15, is seated. A continuous cam groove 16 is milled into the peripheral surface of the piston 13 and cooperates with a cam follower 17 mounted in the peripheral wall of the housing 11 and projecting into the cam groove 16. The cam groove 16 is formed with a dip portion whereby the piston 13 is caused to effect one stroke in each axial direction for each revolution thereof relative to the housing. The piston is assembled by passing slot 16a over the follower 17.

The lower end of the housing 11 is closed by a rotatable cover 18. The cover 18 has a cylindrical reduced portion fitting into the lower end of the housing 11 and extending beyond the peripheral groove provided at the lower end of the latter. To pins 19 are disposed in radial holes provided in the reduced portion of the cover 18. The pins 19 project with their inner ends into a transverse slot milled into a downward extension 20 of the piston 13, said extension 20 projecting into a recess formed in the reduced portion of the cover 18. A compression spring 21 between the inner ends of the pins 19 presses the pins 19 outwardly so that their outer ends rest in the peripheral groove provided at the lower end of the housing 11, thus locking the cover 18 to the housing 11. A ball bearing 22 is disposed between the cover 18 and the housing 11 to transmit thrust from the cover to the housing. The extension 20 of the piston 13 is sufficiently long to engage the inner ends of the pins 19 in each axial position of the piston 13. Thus, the cover 18 is rotatable but not axially displaceable relative to the housing 11 while the piston 13 is rotatable and axially displaceable in the housing 11 and can be axially displaced relative to the cover 18 but is locked to the latter for rotation therewith. Projecting from the oouter surface of the cover 18 is a connector member 23 which is shaped to fit into a power driving unit. The cover 18 may be removed from the housing 11 by inserting pieces of wire through two small diametrically opposed radial holes provided in the housing 11 on the level of the peripheral groove at the lower end of the housing. Thus the pins 19 can be displaced inwardly against the force of spring 21 and the cover 18 will be released from the housing 11.

The upper compartment of the cylindrical housing 11 is closed by means of a rotatable cover 24 which fits into the upper end of the housing 11. A cylindrical guide element 25 projects axially upward and is integral with the cover 24, which latter is provided with an axial bore registering with the hollow space in the cylindrical guide element 25. The cover 24 is connected rotatably to the housing 11 by means of two pins 26 arranged in radial bores in the cover 24 and pressed outwardly into the peripheral groove at the upper end of the housing 11 by means of two small springs 27. In addition, the cover 24, is provided with a plurality, such as, for instance, six, threaded radial bores 28 and the housing 11 is provided near its upper end with a number of radial bores 29 which is either one less or more than the number of radial bores provided in the cover 24. In the example shown, the housing 11 is provided with fire radial bores 29. The bores 28 and 29 have their center lines disposed in a common horizontal plane slightly above the plane containing the center lines of the pins 26 so that the latter cannot be pressed outwardly through the bores 29 when the cover is rotated. A screw 30 fixes or locks the cover 24 against rotation relative to the housing 11 and can be inserted through any of the radial bores 29 of the housing 11 into any registering one of the radial bores 28 of the cover 24. It is thus possible to lock the cover 24 to the housing 11, in any selected one of a number of angular positions, said number being the product of the number of bores 28 in the cover multiplied by the number of bores 29 in the housing. In the example shown, the cover 24 can be locked to the housing in any selected one of 6×5=30 angular positions.

In order to disconnect the cover 24 from the housing 11, the cover is rotated relative to the housing to the position shown in Fig. 4, and pieces of wire are then inserted through one of the bores 29, designated by 29a, which in this position is disposed in the vertical plane containing the common axis of pins 26 and through a small hole provided in the housing 11 diametrically opposite said bore 29a at the level of the peripheral groove near the upper end of the housing to press the pins 26 inwardly against the force of the springs 27 and to effect the desired release.

The transverse wall 12 is provided with an axial discharge passage 31 forming at its upper end a valve seat having a cross-sectional area which is a fraction of the active area of piston 13. A ball relief valve 32 rests on this valve seat 12 to close the discharge passage 31. The ball valve 32 is seated in a valve support 33 which is axially movable in the housing 11 is prevented from rotating relative to the housing 11 by means of a pin 34 having its lower end mounted in the transverse wall 12 and projecting with its upper end slidably into a bore in the valve support 33. The top of the valve support 33 is formed with a stepped cylindrical recess, and a radial pin 35 traverses the lower part of said recess. An annular sealing piston 36 surrounds the valve support 33 and rests with its outer peripheral surface slidably against the inner wall of the upper compartment of housing 11. The sealing piston 36 is freely movable relative to the housing 11 and to the valve support 33 and forms between its lower surface and the upper surface of the transverse wall 12 a reservoir chamber 37 to receive pressure fluid discharged from the variable volume chamber 14 past the relief valve 32. The relief valve 32 is normally held in closed position by means of a compression spring 38 seated with its lower end in the upper part of the recess formed in the top of the valve support 33. The upper end of the spring 38 bears against a disc shaped abutment 39 slidable in the guide element 25 and having a radial projection 40 which projects through a longitudinal slot 41 in the guide element 25. The abutment disc 39 is provided with a central threaded bore, and an adjustor screw 42 is threaded into the disc 39 with its upper end and projects downwardly into the lower part of the recess formed in the valve support 33. The lower end of the screw 42 is fork-shaped and embraces the radial pin 35 carried by the valve support 33. Thus, the screw 42 is held pressed with its upper end against the top wall of the hollow space in the guide element 25 by means of the spring 38 but it is non-rotatable relative to the axially movable valve support 33, which latter is also locked against rotation by means of the pin 34.

A return passage 43 is provided in the transverse wall 12 and a check valve 44 holds this return passage normally closed by means of a weak spring 45 resting on a spring support 46 secured to the lower surface of the partition wall 12.

The upper end of the guide element 25 is formed as a square socket extension 47. This socket extension contains a ball 48 loaded by means of a spring 49 so that socket fittings for gripping nuts, bolts, or other objects to be driven can be snapped in place.

It will be seen that the force of the spring 38 on the relief valve 32 can be varied by removing the locking screw 30 from the bores 28, 29 and turning the guide member 25 and cover 24 relative to the housing 11. Since the adjustor screw 42 is locked against rotation relative to the housing and the spring abutment 39 is forced to rotate with the guide member 25, the abutment 39 will be axially displaced along the guide member 25, thus increasing or decreasing the tension of the spring 38 as desired.

A gradation 50 is marked alongside the slot 41 in the guide element 25 and the radial projection 40 is provided in its end face with a transverse index mark. The gradation 50 is calibrated to indicate the maximum transmissible torque for each setting in accordance with the axial displacement of the spring abutment 39 along the guide element 25 on rotation of the latter relative to the housing 11. A second gradation 51 is provided along the periphery of the cover 24 for cooperation with an index mark 52 on the upper rim of the housing 11 to indicate the maximum transmissible torque for predetermined fractions of each revolution of the guide member 25 and cover 24 relative to the housing 11.

The device operates as follows: After the cover 24 has been rotated relative to the housing 11 to give to the spring 38 the desired tension and thus set the device for the maximum torque to be transmitted, the locking screw 30 is inserted in the holes 28, 29 which happen to register. A suitable socket attachment is snapped on to the socket extension 47 to grip the object to be driven, and the connector member 23 is connected to a power driving unit. As the cover 18 is rotated by the driving unit the piston 13 revolves relative to the housing 11. However, the cam dip in the continuous cam groove 16 bears against the cam follower 17 so that force is applied on the piston tending to move it axially towards the transverse wall 12. The piston 13 is prevented from carrying out this axial movement by the hydraulic press action of the entrapped fluid in the variable volume chamber 14, thus causing a pressure to be developed within the fluid. This fluid pressure is directly proportional to the applied torque. The relief valve 32 and the check valve 44 prevent the fluid from escaping through the passages 31 and 43, respectively, so that the piston 13 is hydraulically locked to the housing 11; hence, the piston and housing turn as a unit which transmits to the object to be driven the torque applied to the connector member 23 by the power drive unit.

The fluid under pressure tends to open the relief valve 32 in the reservoir chamber 37, but tends to seat the check valve 44 located in the variable volume chamber 14. As the applied torque is increased, the force tending to open the relief valve 32 increases. When the torque has been increased to such an extent that the force acting on the relief valve 32 due to the fluid pressure in the variable volume chamber 14 is greater than the force of the spring 38, the valve 32 opens and allows the fluid to flow from the variable volume chamber 14 into the reservoir chamber 37. This permits the piston 13 to turn freely relative to the housing 11 since the piston is no longer prevented from moving axially in order to follow the contour of the cam groove 16 cooperating with the cam follower 17. Hence, torque is no longer transmitted to the object to be driven as the piston and housing do not turn as a unit.

As the fluid flows into the reservoir chamber 37 the sealing piston 36 prevents the fluid from escaping from the coupling. The fluid in the reservoir chamber 37 is obviously not subjected to more than atmospheric pressure because the sealing piston 36 is free to follow the fluid as it enters the reservoir chamber 37.

As the piston 13 is turned further in the housing 11 it is forced axially downward by the cam follower 17 when the dip portion of the cam groove 16 has passed the cam follower. The downward movement of the piston 13 creates a reduction of pressure in the variable volume chamber 14 and draws the fluid from the reservoir chamber 37 past the uni-directional check valve 44. The valve spring 45 is very weak and only serves to hold the ball valve 44 against its seat with as little force as possible. Thus, the ball valve 44 offers negligible resistance to the fluid during the return flow.

The cycle involving the flow of pressure fluid from the variable volume chamber 14 to the reservoir chamber 37 and back from the reservoir chamber 37 into the variable volume chamber 14 is repeated during each revolution as long as the applied torque produces a fluid pressure which is in excess of the limitation obtained by the setting of the spring 38. Since the nut or screw can thus not be driven any tighter, the wrench is then removed. It will be apparent that the coupling according to the invention permits a predetermined amount of torque to be transmitted, but when this torque value is exceeded the driven part of the coupling stops while the power driven end of the coupling continues to turn.

The important novel principle incorporated in this invention will be understood more easily by comparing the device according to the invention with a similar device containing only a piston like piston 13, and a spring like spring 38 acting directly on said piston without interposition of a fluid filled variable volume chamber. In such construction the required spring force would be about 1500 to 2000 pounds for a 700 inch pound torque range, for example. On the other hand, in the arrangement including a fluid filled variable volume chamber the 1500–2000 pound force is applied to the fluid by a piston of relatively large active area. In this case, the spring 38 bears on a relief valve 32 of very small area compared to the active area of the piston and, therefore, the maximum required force of the spring 38 will be only about 15–20 pounds for the 700 inch pound torque range. This follows from the fact that uniform pressure is developed within the fluid in the variable volume chamber 14 but the area of the relief valve 32 exposed to the fluid is merely a fraction of the active area of the piston and, consequently, the fluid force acting on the relief valve is considerably less than the force exerted by the piston 13.

According to the invention, the required size and force of the control spring 38 is reduced about 80–120 times compared to an arrangement without a fluid filled variable volume chamber. The advantage obtained can be calculated by considering the equations for the force of the spring 38 with and without interposition of a fluid filled variable volume chamber:

Without a fluid chamber it can be shown that:

$$(1) \quad F_s = \frac{2T}{D_p \tan A}$$

and with a fluid chamber, it can be shown that:

$$(2) \quad F_0 = \frac{2T D_v^2}{D_p^3 \tan A}$$

where:

$F_s$=required force of the spring 38 of Fig. 1 without a fluid chamber.

$F_0$=required force of the spring 38 of Fig. 1 with a fluid chamber.

$T$=applied torque.

$D_v$ = diameter of the seat of the relief valve 32 of Fig. 1.
$D_p$ = diameter of the piston 13 in Figs. 1 and 5.
$A$ = angle of cam rise shown in Fig. 1 (30° in this example).

By dividing Equation 1 by Equation 2.

(3) $$\frac{F_s}{F_0} = \left(\frac{D_p}{D_v}\right)^2$$

or the force of the spring required with and without a fluid chamber varies as the square of the ratio of the exposed diameter of the relief valve to the diameter of the cam-piston. This statement can be shown by an example using Equation 3. If $D_p = 1\frac{1}{4}$ in. and $D_v = \frac{1}{8}$ in.;

$$\frac{F_s}{F_0} = \left(\frac{5/4}{1/8}\right)^2 = (10)^2 = 100$$

Thus, if the variable volume chamber 14 is omitted, a spring force is required which is 100 times the spring force necessary in a construction including a liquid filled variable volume chamber, according to the invention.

Figs. 6 to 10 show an embodiment of the present invention in the form of a hand operated wrench for tightening nuts, bolts, or similar rotatable objects.

In these figures, 53 is a cylindrical housing closed at one end and open at the other end and having a radial extension 54 shaped substantially as a solid cylinder on an axis at right angles to the main axis of the housing 53. A piston 55 is slidable and rotatable in the housing 53 and is guided therein by means of a cam follower 56 mounted in the peripheral wall of the housing 53 and extending into a continuous cam groove 57 milled into the peripheral surface of the piston 55. An annular gasket 58 seated in a peripheral groove surrounding the lower part of the piston 55 seals the pressure liquid contained in the variable volume chamber 59 against escaping past the piston 55. The piston 55 is assembled in the cylindrical housing 53 by passing the follower 56 through the slot 57a.

The open end of the housing 53 is closed by means of a cover 60 which is rotatable on and axially secured to the housing 53 in the manner described with respect to Fig. 1 by means of pins 61 extending through radial bores in a reduced cylindrical portion of the cover 60 projecting into the housing 53. A spring 62 presses the pins 61 outwardly to hold them normally in a position in which their outer ends are seated in a peripheral groove provided in the housing 53 while their inner ends extend into a slot formed in a downward extension 63 of the piston 55 projecting into the recess in the reduced portion of the cover 60. A ball bearing is interposed between the housing 53 and the cover 60 as described with respect to Fig. 1. A square socket extension 64 is integral with and projects axially from the outer surface of the cover 60. This socket extension contains a ball 65 loaded by a spring 66 so that socket fittings for driving nuts, bolts or similar rotatable objects can be snapped on.

A tubular handle 67 is fitted over the radial extension 54 of the housing 53 and is held in place by means of a pin 68 located in a bore in the extension 54 and urged by means of a spring 69 into a registering hold in the handle 67. An annular gasket 70 seated in a peripheral groove of the extension 54 prevents fluid from passing from the hollow handle between the inner surface of the handle 67 and the outer surface of the extension 54 to the outside. The extension 54 is provided at its outer end with a recess 71, and an inclined channel 72 connects this recess with the variable volume chamber 59. Applied to the outer end of the extension 54 is a cylindrical plug 73 provided with an axial bore 74 and an eccentric bore 75 both terminating in the recess 71 provided in the end face of the extension 54. The plug 73 is secured to the end face of the extension 54 by means of screws 76. A perforated sealing disc 77 is interposed between the end face of the extension 54 and the plug 73. A ball check valve 78 is seated in the recess 71 and pressed by means of a weak spring 79 against a valve seat formed by the adjacent edge of the eccentric bore 75. A relief ball valve 80 rests on a valve seat formed by the edge of the axial bore 74 on the opposite side of the plug 73, said valve seat having a cross-sectional area which is a fraction of the active area of the piston 55. A valve support 81 for the relief valve 80 is slidably mounted in the tubular handle 67 and provided with perforations to permit the passage of liquid therethrough. The valve 80 and valve support 81 are urged into the position in which the valve 80 closes the discharge passage 74 by means of a spring 82 arranged co-axially in the handle 67 and bearing with one end thereof on the valve support 81. The other end of the spring 82 rests against a spring support 83 which is also slidable in the handle 67 and perforated for the passage of liquid. The spring support 83 is connected by a rod 84 with a nut element 85 slidable in the outer end portion of the handle 67 and secured against rotation by means of a radial pin 86 projecting into an elongated slot 87 in the handle 67. The rod 84 passes through a sealing piston 88 which is slidable relative to the handle 67 and to the rod 84. Thus a reservoir chamber 89 is formed between the plug 75 and the sealing piston 88. In order to prevent the development of air pressure on the sealing piston 88, the nut 85 is partially cut away to provide a passage 90 leading to an outlet port 91 in the handle.

The entire oil chamber in this embodiment extends from the top surface of the cam piston 55 through passage 72, recess 71, passages 74, 75 and chamber 89 to the sealing piston 88.

The free end of the handle 67 is closed by a rotatable cover 92 including a reduced cylindrical portion 93 which fits into the open end of the handle 67 and is provided with a diametrical bore receiving two pins 94 pressed by means of a spring 95 outwardly into a peripheral groove near the outer end of the handle 67.

A screw 96 projects axially inwardly from the reduced portion 93 of the cover 92 and engages the threaded bore of the nut 85. Thus, rotation of the cover 92 relative to the handle 67 about the axis of the latter displaces the nut 85 axially of the handle 67 and causes the spring support 83 to move toward or away from the valve support 81, thus varying the force of the spring 82. A gradation 97 is marked along the slot 87 and cooperates with a marking on the face of the pin 86 to indicate the maximum transmissible torque for each setting in accordance with the axial displacement of the nut 85 on rotation of the cover 92. The cover 92 is provided with a peripheral gradation 98 cooperating with an index mark 99 on the outer surface of the handle 67 to indicate the maximum transmissible torque for predetermined fractions of each revolution of the cover 92 relative to the handle 67.

Although the design shown in Figs. 6 to 10 is different from that illustrated in Figs. 1 to 5, the operating principle is substantially the same. If the wrench shown in Figs. 6 to 10 is to be used, for instance, for the driving of a hexagonal nut, a hexagonal socket attachment is snapped on to the socket extension 64 and the torque wrench is then placed on the nut to be driven. Torque is applied to the housing 53 by applying force to the handle 67 manually. Since the piston 55 is hydraulically prevented from rising in the housing 53, the applied torque is transmitted to the piston by means of the cam follower 56 bearing against the dip in the cam groove 57 in the piston 55. The torque is then transmitted to the nut by means of the locking pins 61 in the same manner as in the arrangement according to Figs. 1 to 5. When the applied torque exceeds the value initially selected by adjusting the cover 92, the fluid pressure developed within the variable volume chamber 59 produces a force on the valve 80 that exceeds the force of the spring 82. The valve 80 then opens and allows th fluid to flow from the variable volume chamber 59 through the channel 72 and passage 74 past the valve 80 into the reservoir chamber 89. Now, the piston 55 can rise and turn freely in the housing 53 so that no greater torque can be applied. As the fluid flows into the reservoir chamber 89 it is retained by the free moving sealing piston 88 so that virtually no pressure is developed within the reservoir chamber 89. When turning of the handle is continued, the piston moves downward in accordance with the contour of the cam groove 57. The down stroke of the piston 55 causes the uni-directional check valve 78 to open and thus allows the fluid to return to the variable volume chamber 59.

It is obvious that the principle of the present invention can be applied to various torque couplings other than those shown and described herein, and it is to be understood that the scope of the invention is not limited to the specific examples illustrated except as defined by the following claims.

I claim:

1. A torque transmitting coupling device for disposition between driving means and a driven element and adapted to completely release upon the application of a substantially predetermined torque comprising, a member having a cylinder, a second member, one of which is a driving member and the other of which is a driven member, means connecting the two members together against substantial axial movement and for complete relative rotary movement, a piston in the cylinder member, means slidably and drivably connecting the piston and the second member, a fixed head in the first named member defining a first chamber between the piston and said head, displaceable means in the first named member for defining a reservoir chamber between the fixed head and displaceable means, the two chambers providing a system adapted to be completely filled with hydraulic medium, a pressure regulator valve in the fixed head for controlling the flow of hydraulic medium from the first chamber to the reservoir chamber including spring means active on the valve for at all times tending to close the same, a check valve in the fixed head for the flow of hydraulic medium from the reservoir chamber to the first chamber, and cam means including a cam track and a cam follower, one on the cylinder member and one on the piston, said cam track having a lift portion adapted to engage the follower incident to relative rotary movement between the cylinder member and piston caused by torque to thereby shift the piston axially for the displacement of the hydraulic medium from the first chamber to the reservoir chamber, said lift portion being of substantial length for the travel of the follower along the same, whereby the releasing action takes place through substantial relative angular movement of the cylinder member and piston, while maintaining the torque applied substantially uniformly.

2. A torque transmitting coupling device for disposition between driving means and a driven element and adapted to completely release upon the application of a substantially predetermined torque comprising, a cylinder member, a second member, one of which is a driving member and the other of which is a driven member, means connecting the two members together against substantial axial movement and for complete relative rotary movement, a piston in the cylinder member, means slidably and drivably connecting the piston and the second member, a fixed head in the cylinder member defining a first chamber between the piston and said head, displaceable means in the cylinder member for defining a reservoir chamber between the fixed head and displaceable means, the two chambers providing a system adapted to be completely filled with hydraulic medium, a pressure regulator valve in the fixed head for controlling the flow of hydraulic medium from the first chamber to the reservoir chamber including spring means acting on the valve for at all times tending to close the same, a check valve in the fixed head for the flow of hydraulic medium from the reservoir chamber to the first chamber, and cam means including a cam track and a cam follower, one on the cylinder member and one on the piston, said cam track having a lift portion adapted to engage the follower incident to relative rotary movement between the cylinder member and piston caused by torque to thereby shift the piston axially for the displacement of the hydraulic medium from the first chamber to the reservoir chamber, said lift portion being of substantial length for the travel of the follower along the same, whereby the releasing action takes place through substantial relative angular movement of the cylinder member and piston, while maintaining the torque applied substantially uniformly, and means for adjusting the said spring means of the pressure regulator valve to govern the pressure required for such displacement of the hydraulic medium.

3. A torque transmitting coupling device for disposition between driving means and a driven element and adapted to completely release upon the application of a substantially predetermined torque comprising, a cylinder member, a second member, one of which is a driving member and the other of which is a driven member, means connecting the two members together against substantial axial movement and for complete relative rotary movement, a piston in the cylinder member, means slidably and drivably connecting the piston and the second member, a fixed head in the cylinder member defining a first chamber between the piston and said head, displaceable means in the cylinder member for defining a reservoir chamber between the fixed head and displaceable means, the two chambers providing a system adapted to be completely filled with hydraulic medium, a pressure regulator valve in the fixed head for controlling the flow of hydraulic medium from the first chamber to the reservoir chamber including spring means acting on the valve for at all times tending to close the same, a check valve in the fixed head for the flow of hydraulic medium from the reservoir chamber to the first chamber, and cam means including a cam track and a cam follower, one on the cylinder member and one on the piston, said cam track having a lift portion adapted to engage the follower incident to relative rotary movement between the cylinder member and a piston caused by torque to thereby shift the piston axially for the displacement of the hydraulic medium from the first chamber to the reservoir chamber, said lift portion being of substantial length for the travel of the follower along the same, whereby the releasing action takes place through substantial relative angular movement of the cylinder member and piston, while maintaining the torque applied substantially uniformly, the said displaceable means being open to atmospheric pressure on the side thereof opposite the second chamber.

4. A torque transmitting coupling device for disposition between driving means and a driven element and adapted to completely release upon the application of a substantially predetermined torque comprising, a cylinder, a piston in the cylinder, one of which is a driving member and the other of which is a driven member, a fixed head in the cylinder defining a first chamber between the piston and said head, displaceable means in the cylinder for defining a reservoir chamber between the fixed head and said displaceable means, the two chambers providing a system adapted to be completely filled with hydraulic medium, a pressure regulator valve in the fixed head including a part extending through the said displaceable means and including yieldable means normally holding the valve closed, a check valve in the fixed head for the flow of hydraulic medium from the reservoir chamber to the first chamber, and cam means including a circumferential cam track and a follower, one on the cylinder and one on the piston for connecting the cylinder and piston for complete relative rotary movement, said cam track having a lift portion adapted to engage the follower incident to relative rotary movement between the cylinder and piston caused by torque to thereby shift the piston axially for the displacement of the hydraulic medium from the first chamber to the reservoir chamber, said lift portion being of substantial length for the travel of the follower along the same, whereby the releasing action takes place through substantial relative angular movement of the cylinder and piston, while maintaining the torque applied substantially uniformly.

5. A torque transmitting coupling device for disposition between driving means and driven means and adapted to completely release upon the application of a substantially predetermined torque comprising, a member having a cylinder, a piston in the cylinder, one of which is a driving member and the other of which is a driven member, a head in said member defining a pressure chamber between the piston and said head, means in said member defining a reservoir chamber on the side of the head opposite the pressure chamber, said means being readily displaceable relative to the head so that the reservoir chamber is readily variable in capacity, the two chambers providing a system adapted to be completely filled with hydraulic medium, a pressure regulator valve including a port connecting the two chambers and including a valve member, spring means acting on the valve member to seat it in the port to close the same, a check valve interconnecting the two chambers for relatively free flow of hydraulic medium from the reservoir chamber to the pressure chamber, cam means including a circumferential cam track and a follower, one on the cylinder and one on the piston, for connecting the cylinder and piston for complete rotary movement, said cam track having a lift portion adapted to engage the follower upon relative rotary movement between the cylinder and piston caused by transmitted torque to thereby shift the piston axially for displacement of the hydraulic medium from the pressure chamber to the reservoir chamber through the said port, adjustable means for varying the load exerted by the spring on the valve member, to vary the control of the flow of hydraulic medium through the said port and thereby determine the torque required to produce the relative rotary movement of the piston and cylinder and axial shift of the piston, said lift portion being of substantial length whereby the releasing action takes place through a substantial relative angular movement of the cylinder and piston, as the transmitted torque is maintained substantially uniformly by the controlled flow of the hydraulic medium through the said port.

6. A torque transmitting coupling device for disposition between driving means and driven means and adapted to completely release upon the application of a substantially predetermined torque comprising, a member having a cylinder, a piston in the cylinder, one of which is a driving member and the other of which is a driven member, a head in said member defining a pressure chamber between the piston and said head, means in said member defining a reservoir chamber on the side of the head opposite the pressure chamber, said means being readily displaceable relative to the head so that the reservoir chamber is readily variable in capacity, the two chambers providing a system adapted to be completely filled with hydraulic medium, an automatic pressure regulator device including a port connecting the two chambers and including a valve member, spring means acting on the valve member to seat it in the port to close the same, a check valve interconnecting the two chambers for relatively free flow of hydraulic medium from the reservoir chamber to the pressure chamber, cam means including a circumferential cam groove and a follower, one on the cylinder and one on the piston, for connecting the cylinder and piston for complete rotary movement, said cam groove having a lift portion adapted to engage the follower upon relative rotary movement between the cylinder and piston caused by transmitted torque to thereby shift the piston axially for displacement of the hydraulic medium from the pressure chamber to the reservoir chamber through the said port, said lift portion being of substantial length whereby the releasing action takes place through a substantial relative angular movement of the cylinder and piston, as the transmitted torque is maintained substantially uniformly by the controlled flow of the hydraulic medium through the said port, said cam groove having a reverse lift portion for causing axial movement of the piston back to its operating position with displacement of the hydraulic medium from the reservoir chamber to the pressure chamber through the said check valve.

ROBERT H. THORNER.

REFERENCES CITED

The following references are of record in the file of this patent:

UNITED STATES PATENTS

| Number | Name | Date |
|---|---|---|
| 1,860,871 | Pouliot | May 31, 1932 |
| 1,919,437 | Le Fevre | July 25, 1933 |
| 2,293,786 | Worden | Aug. 25, 1942 |
| 2,293,787 | Worden | Aug. 25, 1942 |
| 2,378,956 | Thorner | June 26, 1945 |
| 2,398,392 | Page | Apr. 16, 1946 |